United States Patent
Savoor et al.

(10) Patent No.: US 8,613,009 B2
(45) Date of Patent: *Dec. 17, 2013

(54) SYSTEM AND METHOD FOR A VIDEO CONTENT SERVICE MONITORING AND PROVISIONING ARCHITECTURE

(75) Inventors: Raghvendra Savoor, Walnut Creek, CA (US); Zhi Li, Martinez, CA (US); Orestis Manthoulis, Sausalito, CA (US); Russell Bellford, New Berlin, WI (US); Stuart L. Blackburn, San Ramon, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,607

(22) Filed: Jul. 9, 2012

(65) Prior Publication Data

US 2012/0284737 A1 Nov. 8, 2012

Related U.S. Application Data

(63) Continuation of application No. 11/486,852, filed on Jul. 13, 2006, now Pat. No. 8,239,886.

(51) Int. Cl.
| | |
|---|---|
| H04H 60/33 | (2008.01) |
| H04H 60/45 | (2008.01) |
| H04H 60/56 | (2008.01) |
| H04N 7/10 | (2006.01) |
| H04N 7/025 | (2006.01) |

(52) U.S. Cl.
USPC ........ 725/14; 725/9; 725/10; 725/11; 725/13; 725/34; 725/35

(58) Field of Classification Search
USPC .......................... 725/9, 10, 11, 13, 14, 34, 35
See application file for complete search history.

(56) References Cited

U.S. PATENT DOCUMENTS

| 5,374,951 A | 12/1994 | Welsh |
| 6,026,397 A | 2/2000 | Sheppard |

(Continued)

FOREIGN PATENT DOCUMENTS

| WO | WO-03053039 | 6/2003 |
| WO | WO-2008008439 | 1/2008 |

OTHER PUBLICATIONS

"International Application Serial No. PCT/US2007/015904", International Search Report mailed Feb. 12, 2008, 6 pgs.

(Continued)

*Primary Examiner* — Dominic D Saltarelli
(74) *Attorney, Agent, or Firm* — Guntin & Gust, PLC; Douglas Schnabel (57) ABSTRACT

According to one example embodiment a storage medium having computer instructions which, responsive to being executed by at least one processor, cause the at least one processor to perform operations. The operations can include analyzing data from data sources of an internet-protocol television network where the data provided by the data sources includes set-top-box data having voice over internet protocol usage for a plurality of subscribers of the internet protocol television network in a geographic area and correlating video provisioning information obtained from the data sources, individual subscriber channel viewing information, internet-usage data, subscriber data and demographic data to produce correlated information. The operations can include generating one or more reports associated with the plurality of subscribers in the geographic area based on the correlated information. Other embodiments are disclosed.

20 Claims, 8 Drawing Sheets

(56) References Cited

U.S. PATENT DOCUMENTS

| | | |
|---|---|---|
| 6,177,931 B1 | 1/2001 | Alexander |
| 6,199,206 B1 | 3/2001 | Nishioka |
| 6,530,082 B1 | 3/2003 | Del Sesto |
| 6,697,792 B2 | 2/2004 | Bunney |
| 6,718,551 B1 | 4/2004 | Swix et al. |
| 7,644,423 B2 | 1/2010 | Ludvig |
| 2002/0059094 A1 | 5/2002 | Hosea |
| 2002/0078441 A1 | 6/2002 | Drake |
| 2002/0112233 A1 | 8/2002 | Bonilla |
| 2002/0123928 A1 | 9/2002 | Eldering |
| 2002/0144262 A1 | 10/2002 | Plotnick |
| 2002/0152117 A1 | 10/2002 | Cristofalo |
| 2002/0157092 A1 | 10/2002 | Kitsukawa |
| 2003/0172374 A1 | 9/2003 | Vinson |
| 2003/0229892 A1 | 12/2003 | Sardera |
| 2004/0002896 A1 | 1/2004 | Alanen |
| 2004/0003413 A1 | 1/2004 | Boston |
| 2005/0229227 A1 | 10/2005 | Rogers |
| 2005/0262540 A1 | 11/2005 | Swix |
| 2007/0162932 A1 | 7/2007 | Mickle |

OTHER PUBLICATIONS

"International Application Serial No. PCT/US2007/015904", Written Opinion mailed Feb. 12, 2008, 7 pgs.

Baldwin, "A Comparison of Profile Based Advertising Schemes", IEEE / SMC International Conference on System of Systems Engineering, (Apr. 24, 2006), 297-302.

Brassil, "Large-Scale Personalized Video Streaming with Program Insertion Proxies", IEEE Communications Magazine, IEEE Service Center, vol. 42(8), (Aug. 2004), 104-110.

710 – View Level: [National Level ▽]
715 – Region: [West ▽]
720 – Market: [San Francisco ▽]
725 – ZIP Code: [         ]

*FIG. 7*

| INFORMATION CATEGORY | DEMOGRAPHIC INFORMATION | SUBSCRIBING INFORMATION | VoD/TV PROGRAM PROVISIONING INFORMATION | CHANNEL VIEWING | TV PROGRAM VIEWING INFORMATION |
|---|---|---|---|---|---|
| WEST | CURRENT INFORMATION | CURRENT STATUS | | CURRENT | CURRENT |
| SOUTHERN NEW ENGLAND | | | | | |
| MIDWEST | | | | | |
| SOUTHWEST | | | | | |
| OVERALL | | | | | |

*FIG. 8*

National TV Program Viewing Information

View Time: Monthly ▽

Secondary Information Category:
Summary of Overall Program Viewed
Summary of Child Program Viewed
Summary of VoD Program Viewed
Summary of Prime Time Program Viewed
Program Ranking

SYSTEM AND METHOD FOR A VIDEO CONTENT SERVICE MONITORING AND PROVISIONING ARCHITECTURE

CROSS-REFERENCE TO RELATED APPLICATIONS

This application is a continuation of U.S. patent application Ser. No. 11/486,852 filed Jul. 13, 2006 which is incorporated herein by reference in its entirety.

FIELD OF THE DISCLOSURE

The subject matter relates to the field of television distribution and programming, and more particularly to methods and systems including monitoring, reporting and provisioning television content and distribution.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006 SBC Knowledge Ventures L.P. All Rights Reserved.

BACKGROUND OF THE DISCLOSURE

Recently, IPTV (Internet Protocol TV) has attracted many service providers' attention to provide live TV programs and video-on-demand (VoD) services. The inherent flexibilities on top of an IP-based video service network can facilitate advanced and flexible video services (such as picture-in-picture), high quality pictures (high-definition TV), and large amount of information (large number of TV channels).

DETAILED DESCRIPTION

In the following detailed description, reference is made to the accompanying drawings that form a part hereof, and in which are shown by way of illustration specific embodiments in which the inventive subject matter can be practiced. It is understood that other embodiments may be utilized and structural changes may be made without departing from the scope of the present disclosure. The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning may be clear from its use in the context of the description.

According to various example embodiments, the disclosed subject matter described herein provides video service monitoring and provisioning services for IPTV networks. Such embodiments may include the capability to provide more monitoring and rating information with different categories, viewing levels, and timelines. Further, the target users of such information may include not only IPTV content providers, but also IPTV advertisers. The monitoring results, information prediction, and content provisioning may also be customized for different groups of users. In addition, monitoring and prediction results may be based on all the subscribers instead of sampling results from a subset of all subscribers. Further, according to one example embodiment, the monitoring may be used to provide customized video services from IPTV content providers and TV advertisers.

According to other example embodiments of the disclosed subject matter, there is provided methods and systems to monitor, analyze, and predict subscribers' viewing habits and interests. The results of the monitoring, analysis and prediction may be, for example, used to provide customized video content and IPTV advertisements that are delivered to IPTV viewers. Further, the methods and systems may be used to obtain accurate IPTV subscriber usage information that may be: i) used to manage the network traffic and guarantee IPTV video service quality; ii) used by the content providers to retrieve subscribers' viewing interest and enhance TV program quality; and iii) used by TV commercial advertisers to understand the subscribers' interests and viewing habits so as to improve marketing campaigns, advertising sales, and relationships with networks.

Figure 1:
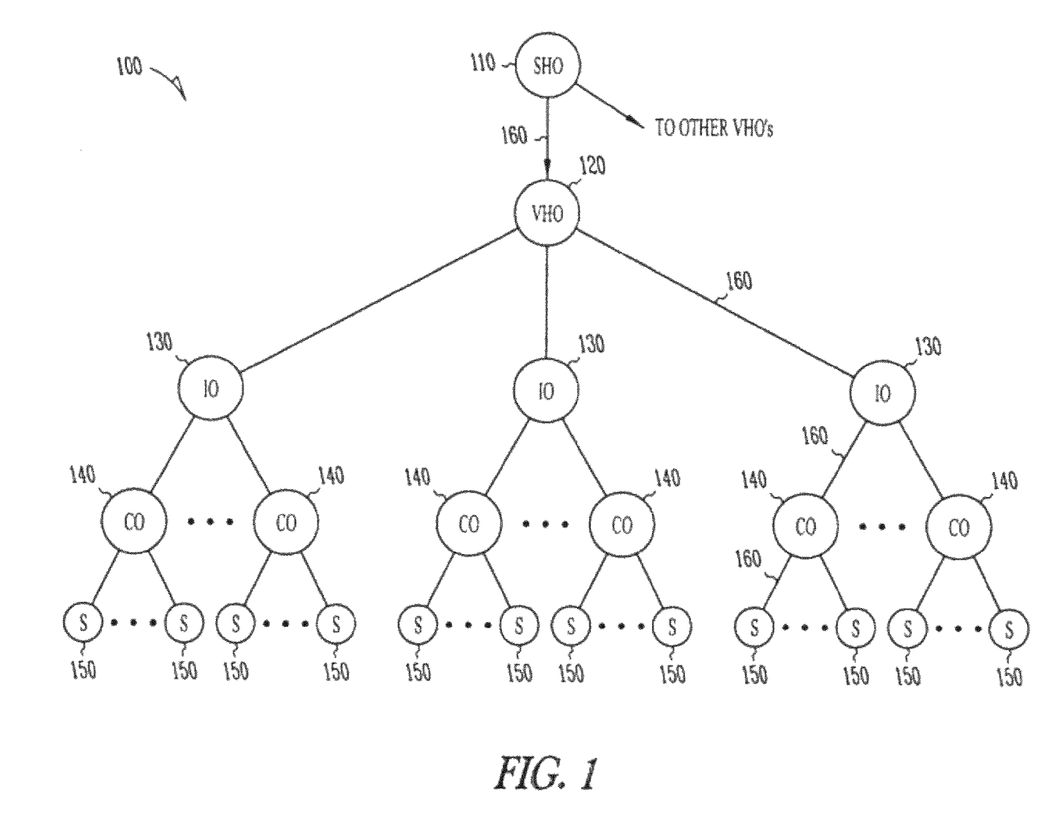
FIGS. 1-3 illustrate an Internet-protocol television (IPTV) system according to one embodiment of the inventive subject matter hereof.
Figure 2:
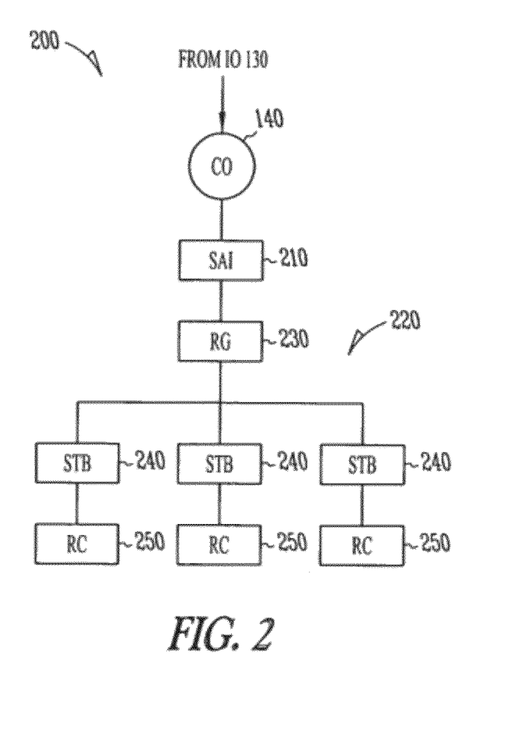
Figure 3:
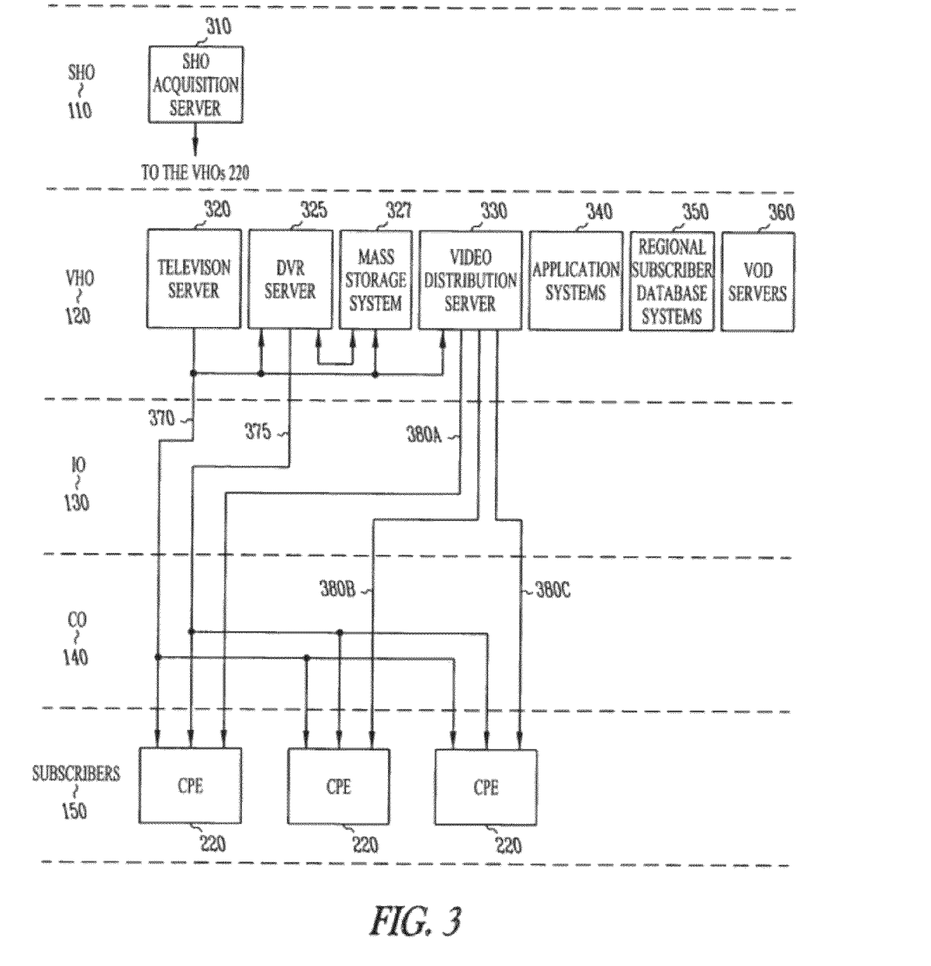

Referring to FIGS. 1,2 and 3, there is illustrated schematic diagrams depicting a configuration of an IPTV network 100 in accordance with one embodiment of the inventive subject matter hereof. As shown in FIG. 1, the network 100 includes a super hub office (SHO) 110 for acquisition and encoding of video content, one or more video hub offices (VHO) 120 in each demographic market area (DMA), one or more intermediate offices (TO) 130, one or more central offices (CO) 140 located in each metropolitan area, and finally the subscribers (S) 150, which may be located in single or multiple dwelling units. In one example embodiment, the network 100 may be connected through a plurality of high speed communication links 160 using physical transport layers such as fiber, cable, twisted pair, air or other media.

In one example embodiment, of the IPTV video delivery system, the SHO 110 distributes content to the VHOs 120 which may be spread across a wide geographic territory, such as an entire country. The SHO 110 may, for example, be in a central location for acquisition and aggregation of national-level broadcast TV (or linear) programming A redundant SHO 110 may be provided for backup in case of failure. The SHO 110 may also the central point of on-demand content acquisition and insertion into the IPTV network. Linear programming may be received at the SHO 110 via satellite and processed for delivery to the VHOs 120. On-demand content may be received from various sources and processed/encoded to codec and bit-rate requirements for the communication network for transmission to the VHOs 120 over the high-speed communication links. VHOs 120 are the video distribution points within each demographic market area (DMA) or geographic region.

Referring to FIG. 2, there is illustrated in more detail an example network architecture 200 between the CO 140 and the subscriber 150. A serving area interface (SAI) 210 is connected to the CO 140. SAI 210 may, for example, be located in a weather-proof enclosure proximate the subscriber premises, and may include FTTN equipment. FTTN equipment may also be located in the CO 140. Customer premise equipment includes (CPE) 220, for example, a network interface device (NID) and a residential gateway (RG) 230, for example with a built-in VDSL modem or optical network termination (ONT). In both cases the RG 230 may be connected to the rest of the home set top boxes (STBs) 240 via an internal network such as an Ethernet. Each STB 240 has an associated remote control (RC) 250 that provides data entry to the STB 240 to control the IPTV selections from the IPTV data streams. According to one example embodiment, a STB 240 may be a stand-alone unit capable of, for example but not by way of limitation, receiving video inputs and producing video outputs, receiving user inputs for changing channels (using one or more buttons on the box or the RC 250) or displaying the number of a selected television channel. In an alternate embodiment, a STB 240 may be formed using a personal computer or other such multi-purpose computing device, for example using one or more plug-in cards that can provide the required capabilities of a STB.

Referring to FIG. 3, which illustrates one example embodiment of a configuration according to the inventive subject matter, a SHO server 310 may be used to acquire national content that may be distributed towards the VHOs 120. In an alternative embodiment, live television content may be acquired using a server in the VHOs 120. In this configuration, the VHO 120 may include a live television server 320 and a video server 330, which forward the live television and/or other content toward the subscriber through the intermediate offices (IOs) 130 and the central office (CO) 140. A VHO 120 may also include application systems 340, regional subscriber database systems 350, and VOD servers 360. The COs 140 are connected to the IOs 130 to further distribute traffic towards the subscribers 150. Traffic may reach the subscribers 150 at least partially via either fiber to the node (FTTN) or fiber to the premises (FTTP), or by other types of transmission medium.

As also illustrated in FIG. 3, television server 320 distributes a plurality of live television programs, each typically associated with a television "channel," using a multicast IP protocol data stream 370 through the IOs 130 and COs 140 to the subscribers 150. The routers, switches and other network elements that would normally be present in the IOs 130 and COs 140 are not shown in FIG. 3 in order to simplify the drawing. The number of programs or channels sent in the multicast stream may, without limitation, range up to 800 channels or more using present technology with it being understood that advances in technology may allow many more channels to be sent. The multicast protocol allows for efficient distribution of these signals to a large number of end subscribers. In addition, the video server 330 receives the multicast data stream 370 and distributes selected ones of the live television signals, extracted from the stream 370, using a unicast data stream 380a, 380b and 380c, to specific subscribers 150. In this embodiment, video server 330 may provide a unicast stream, for example in burst mode, of a specific live television channel to any of the subscribers served by the VHO 120. The burst mode instant channel change data stream can be discontinued once the subscriber's system is loaded with enough TV program data so that the multicast stream can "catch up" and take over supplying the program data stream in the multicast mode for more extended term viewing by the subscriber.

As noted above, live IPTV streams are usually delivered based on the IP multicast protocol. The full range of multicast addresses is from 324.0.0.0 to 339.255.255.255. That is, the number multicast streams on top of the Internet can be 16*255*255*255. This provides service providers enough flexibility to deliver different levels of video content for the same TV channel to a large number of subscribers. Further, as the TV streams are delivered based on IP multicast, the backbone traffic increase will at most be $(L-1)*N*B$ irrespective the number of subscribers (except subscriber-specific content), where L is the number of service levels, N is the number of channels which we provide service differentiation and B is the per-stream bandwidth consumption.

Figure 4:
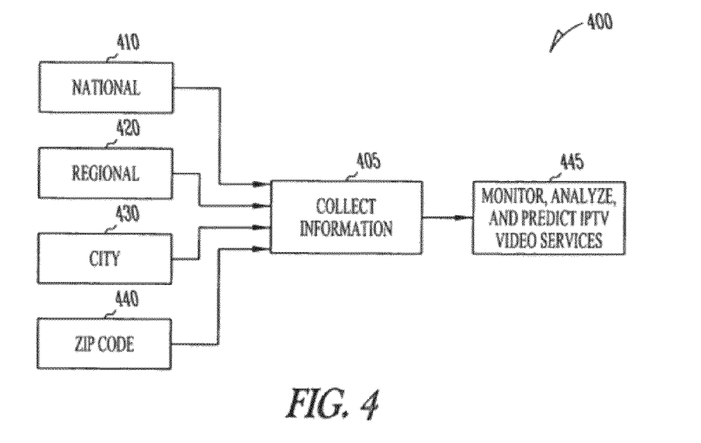
FIG. 4 illustrates a method of monitoring, analyzing and predicting IPTV video services according to one example embodiment of the inventive subject matter hereof.
Figure 5:
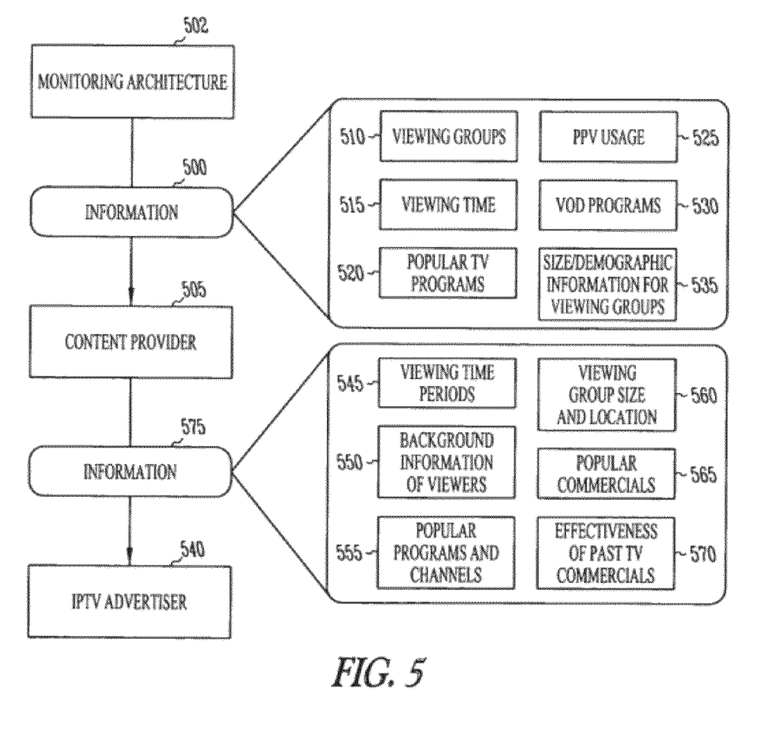
FIG. 5 illustrates different categories of information presented to viewers according to still another example embodiment of the inventive subject matter hereof.

According to one embodiment of the disclosed subject matter illustrated in FIG. 4, there is provided a method 400 of monitoring, analyzing and predicting IPTV video services. Information is collected 405 for different viewing groups, including at least the following different geographic viewing levels: national 410, regional 420, city 430, and/or Zip code 440. At 445, the information is used to monitor, analyze, categorize and predict IPTV video services. As illustrated in FIG. 5, for each viewing level, different users (content providers or TV advertisers, network engineers or others) may be presented with different categories of information. For example, the monitoring architecture 502 can provide information 500 to one or more content providers 505, who may retrieve information 500 about one or more of the following alone or in combination: viewing groups 510, viewing time 515, popular TV programs 520, pay-per-view (PPV) usage 525, video on demand (VoD) programs 530 (or channels), and/or the size and/or demographic information of viewing groups 535. One or more IPTV advertisers 540 may retrieve information 575, such as the viewing time period 545, background information of the viewers 550, popular programs and channels 555, viewing group size and locations 560, popular commercials 565, and/or effectiveness of past TV commercials 570, and more. Based on this information, content providers and IPTV advertisers can maximally utilize the flexibility of IPTV and provide customized content delivery services.

Figure 6:
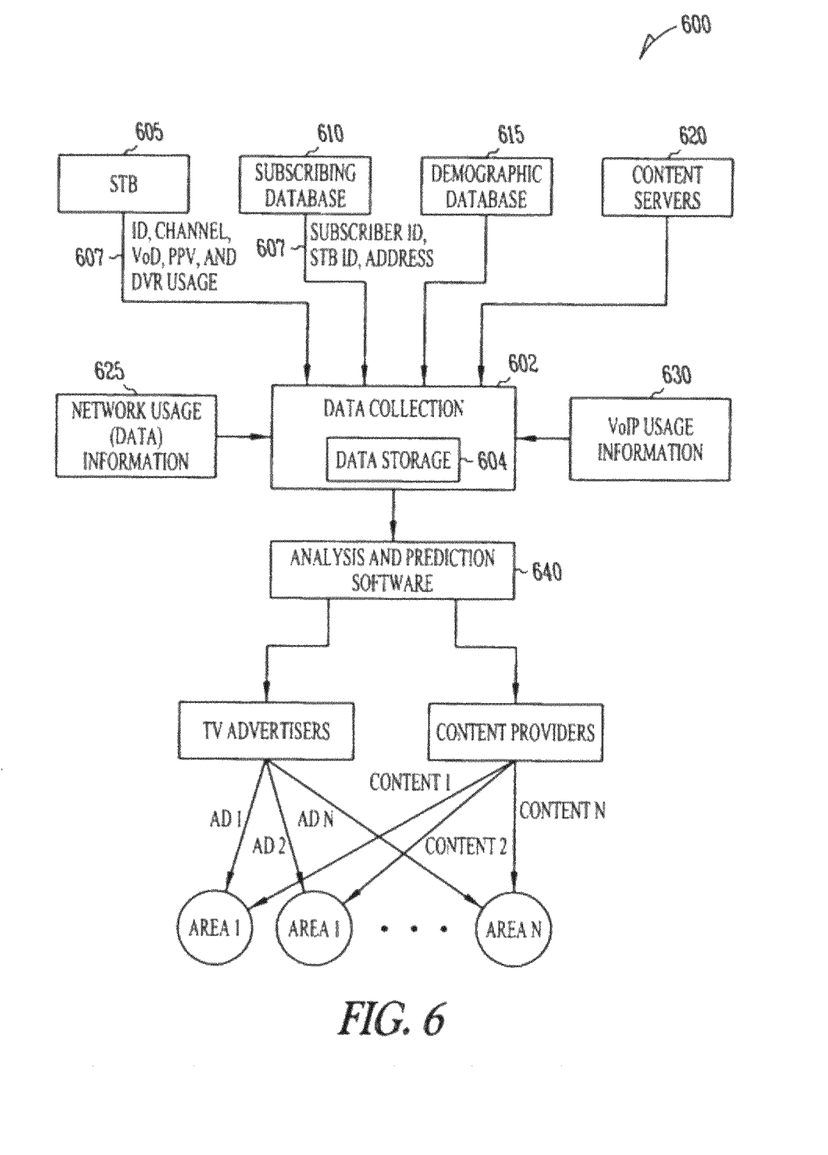
FIG. 6 illustrates an IPTV video service monitoring and provisioning architecture according to still another example embodiment of the inventive subject matter hereof.

Referring to FIG. 6, there is illustrated one example embodiment of IPTV video service monitoring and provisioning system 600. A data collection and analysis server 602, with one or more data storage systems 604, may collect data inputs from different portions and locations of IPTV service network, including the set top box (8TB) 605, located at the premises of subscribers of the IPTV service network. While only one 8TB 605 is illustrated, it shall be understood that it is representative of more than one, if not a great many, 8TBs 605 of the IPTV service network. The 8TB 605 provides the subscribers' 8TB identification (ID), a unique ID 607 for each 8TB 605, as well as the video service usage information for the subscriber, including, for example, digital video recorder (DVR) usage, video-on-demand (VoD) service usage, channel change information, and/or channel viewing time information.

A subscriber database 610, for example located in a service network office such as the 8HO 110 or VHO 120, provides subscriber background information, such as address, profession, income, for each 8TB 605, for example indexed by 8TB ID 607. A subscriber may use more than one 8TB 605, and therefore more than one 8TB 605 may be associated with each subscriber.

A demographic database 615 is further provided, and includes additional demographic information based on market research results, such as the profession, or income, or race distribution in some geographic area, such as geographic area defined by zip code, city, state or other parameters.

A content server 620, such as but not limited to servers 320, 330 and 360, provides information about video provisioning information, such as what programs/TV commercials are shown on each channel during different time period, the TV or VoD program category information (drama, sci-fi, music, news, etc). By correlating this information with subscribers' channel viewing information, each subscriber's viewing habits and interests may be determined Network usage information 625 is also collected, for example from one or more components of the IPTV service network. Network usage information 625 may provide the number of multicast channels in each area that is being used to support broadcasting TV/pay-per-view, the number of unicast streams to support VoD, and any other desired network usage information available from the network. Further, Internet access and usage information for each subscriber may also be collected from an Internet access or usage data source. The Internet usage may be obtained from an Internet access point in the network such as a router, switch or computing system provided in the network between the subscriber's dwelling and the Internet, and may include information concerning the web sites visited by the subscriber or other information on other Internet resources used by the subscriber.

In addition, voice over IP (VoIP) usage information 630 is also collected for each subscriber.

Video usage analysis and prediction software 640 is operative on server 602, and processes and correlates the information obtained from the various sources described above. According to one embodiment, the server 602 may download and store or archive information collected from the various system components, or alternatively download and process the information in real time and store only the results of the processing, or any combination thereof The analysis and prediction software 640 can obtain the TV programs/commercials (drama, comedy, news, etc.) viewers' backgrounds, addresses, viewing time, and any other desired data or information from the components of system 600. According to another example embodiment, based on the past TV viewing dynamic data, the software 640 can predict the future video usage information for each area. The analysis and prediction results may include at least the following three different dimensions of information, for example used for viewing the information: (i) by information property; (ii) by geographical-level; or (iii) by timeline. The dimension of information property may include one or more of the following: (i) IPTV subscribers' background information (Demography, gender, age, profession, average household income, etc.); (ii) IPTV channel/program provisioning Information; (iii) VoD provisioning Information; (iv) subscribing information; (v) TV channel/program viewing time and STB usage information; (vi) TV channel change information; (vii) VoD/PPV/DVR usage information; and/or (viii) TV commercial viewing information.

The dimension of geographic-level information may include: (i) subscriber/household; (ii) zip code; (iii) city/market level; (iv) regional level; and/or (v) national level.

The dimension of time line information may include: (i) hourly (15-minute increments for example); (ii) daily; (iii) monthly; (iv) yearly; and/or (v) multi-year.

Figure 7:
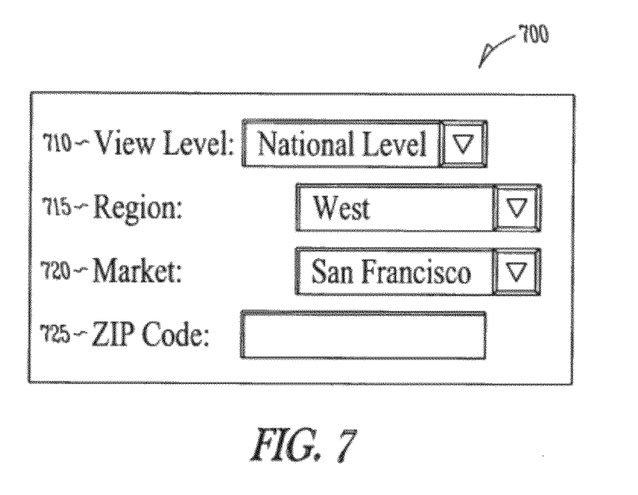
FIGS. 7-10 illustrate user interfaces and data views according to still other example embodiments of the inventive subject matter hereof.

According to one example embodiment, the output of the analysis and prediction software 640 may be customized to IPTV content providers and advertisers. For example, IPTV content providers may be provided with a user-interface 700, served by the software 640, as illustrated in FIG. 7. As illustrated, interface 700 allows a user to select view level 710, a region 715 (e.g., Midwest or state in region), a market 720 (e.g. a city), or a zip code 725.

Figure 8:
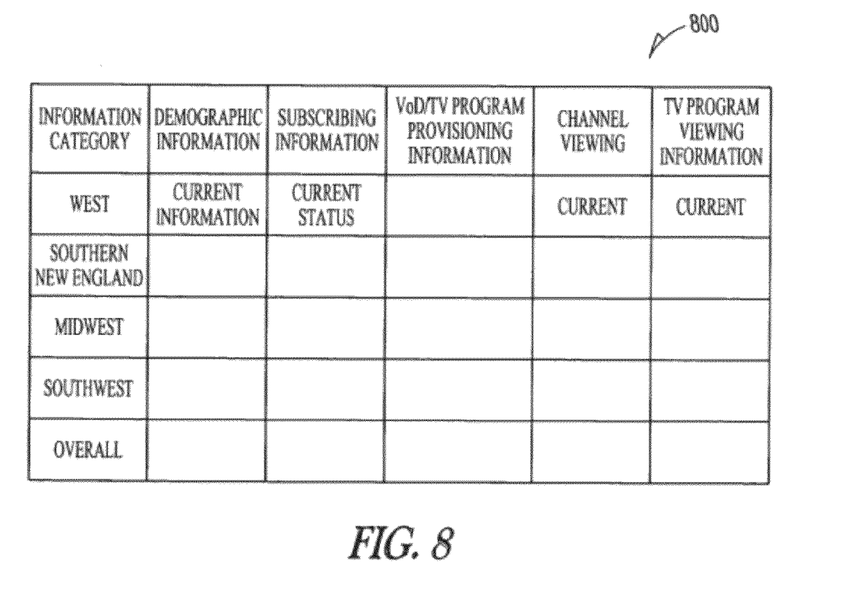

After choosing a view level (such as national level), according to one example embodiment, the view 800 of information illustrated in FIG. 8 may be presented to the IPTV content providers by software 640. The view 800 shows the current view level and its sub-view levels' current status for each information category. The detail information for each category may be presented in different windows.

Figure 9:
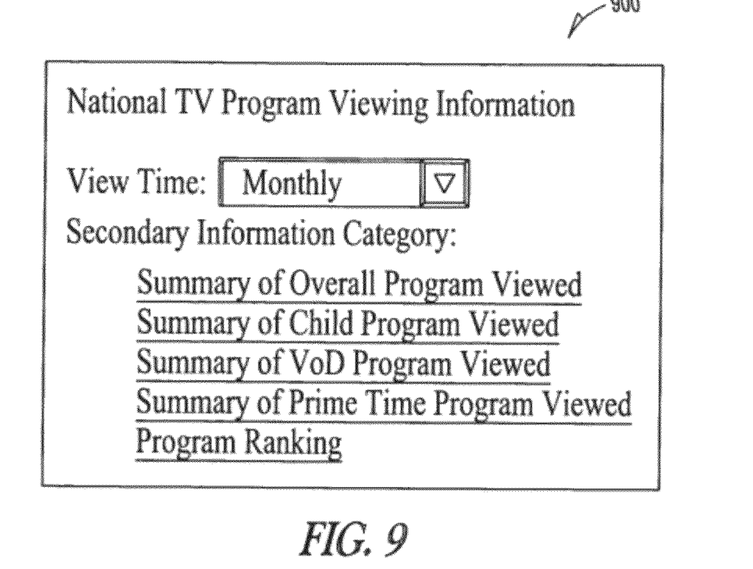
Figure 10:
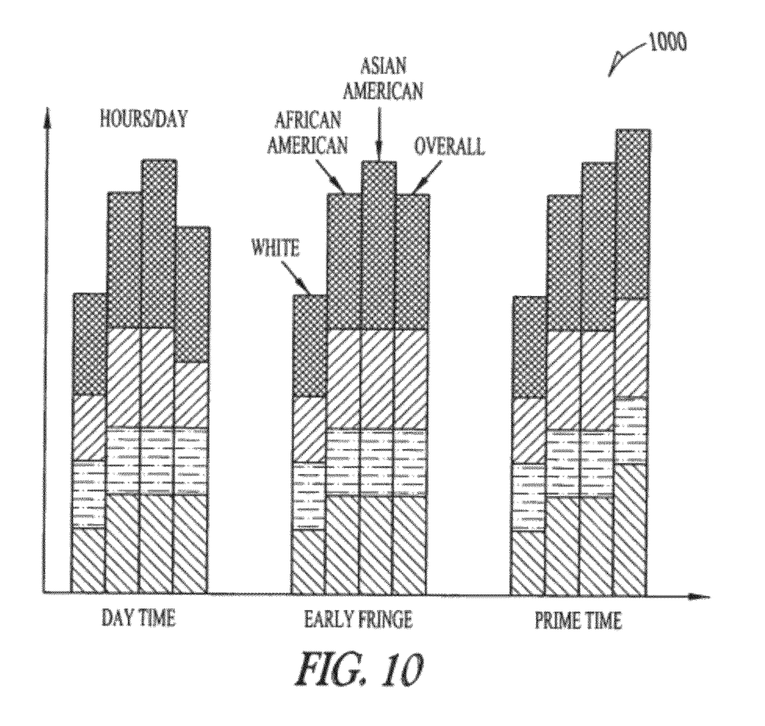

For example, after clicking an information category (such as on the TV Program Information), the user interface 900 illustrated in FIG. 9 may be shown for national level view. For the summary of overall program viewed, the information may be shown in the view 1000 illustrated in FIG. 10, in which each color represents different categories of programs.

According to one example embodiment of a method according to the disclosed subject matter, based on the output of the software 640, content providers and TV advertisers can provide different set customized programs and TV Ads to different group of people so as to enhance their revenue from providing content services or TV Ads. For example, if some area residents spent most of the time watching sports games, it may be better to provide them with more sports related product information or sports game information. If some area people are comparatively wealthy, TV advertisers may provide more high-end products information than other areas. If some area has more young couples, they may prefer more adventure, or sci-fi programs.

Accordingly, by using the flexibility of IPTV, the above-described methods and systems may obtain the video viewers' living and viewing habits, perform analysis and prediction, and help video service providers, content providers, and TV advertisers to provider better service and market campaign.

Thus, according to one example embodiment, the systems and methods described herein may provide IPTV viewing information with different information categories, view levels, and timelines without the direct involvement of subscribers. Further, the monitored and predicted information can facilitate IPTV content providers and advertisers to customize video content services (so as to provide better service and market campaign). Still further, the information provided can be based on all the subscribers' accurate results instead of sampling data results.

Figure 11:
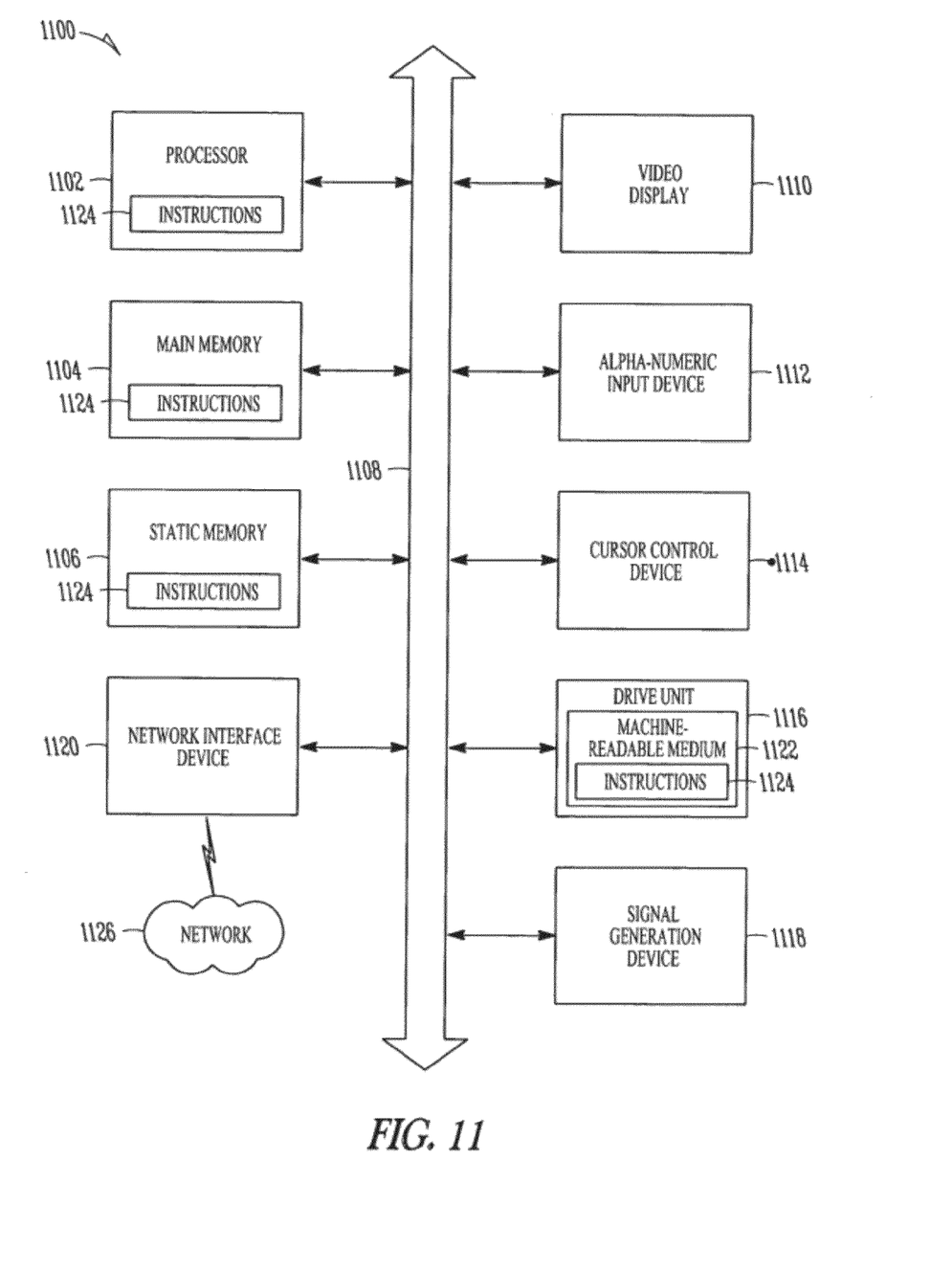
FIG. 11 illustrates a diagrammatic representation of a computing platform according to still other example embodiments of the inventive subject matter hereof.

FIG. 11 shows a diagrammatic representation of a machine in the example form of a computer system 1100 within which a set of instructions, for causing the machine to perform anyone or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" may also be taken to include any collection of machines that individually or jointly execute a set (or multiple sets) of instructions to perform anyone or more of the methodologies discussed herein.

The example computer system 1100 includes a processor 11 02 (e.g., a central processing unit (CPU), a graphics processing unit (GPU) or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a cursor control device 1114 (e.g., a mouse), a disk drive unit 1116, a signal generation device 1118 (e.g., a speaker), and a network interface device 1120. The disk drive unit 1116 includes a machine-readable medium 1122 on which is stored one or more sets of instructions and data structures (e.g., software) 1124 embodying or utilized by anyone or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media. The instructions 1124 may further be transmitted or received over a network 1126 via the network interface device 1120 utilizing anyone of a number of well-known transfer protocols, for example the hyper text transfer protocol (HTTP).

While the machine-readable medium 1118 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform anyone or more of the methodologies of the present disclosure, or that is capable of storing, encoding or carrying data structures utilized by or associated with such a set of instructions. The term "machine-readable medium" may accordingly be taken to include, but not be limited to, solid-state memories, optical and magnetic media, and carrier wave signals.

In this description, numerous specific details are set forth. However, it is understood that embodiments may be practiced without these specific details. In other instances, well-known circuits, software, structures and techniques have not been shown in detail in order not to obscure the understanding of this description. Note that in this description, references to "one embodiment" or "an embodiment" mean that the feature being referred to is included in at least one embodiment. Further, separate references to "one embodiment" in this description do not necessarily refer to the same embodiment; however, neither are such embodiments mutually exclusive, unless so stated and except as may be readily apparent to those of ordinary skill in the art. Thus, the inventive subject matter may include any variety of combinations and/or integrations of the embodiments described herein. Each claim, as may be amended, constitutes an embodiment of the inventive subject matter, incorporated by reference into the detailed description. Moreover, in this description, the phrase "exemplary embodiment" means that the embodiment being referred to serves as an example or illustration. Further, block diagrams illustrate exemplary embodiments herein. Also herein, flow diagrams illustrate operations of the exemplary embodiments of the disclosure. The operations of the flow diagrams are described with reference to the exemplary embodiments shown in the block diagrams. However, it should be understood that the operations of the flow diagrams could be performed by embodiments of the disclosure other than those discussed with reference to the block diagrams, and embodiments discussed with reference to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

Further, although the present specification describes components and functions implemented in the embodiments with reference to particular standards and protocols, the disclosure may be not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

Although the inventive subject matter has been described with reference to several example embodiments, it may be understood that the words that have been used are words of description and illustration, rather than words of limitation. Changes may be made within the purview of the appended claims, as presently stated and as amended, without departing from the scope and spirit of the inventive subject matter in all its aspects. Although the inventive subject matter has been described with reference to particular means, materials and embodiments, the inventive subject matter is not intended to be limited to the particulars disclosed; rather, the subject matter extends to all functionally equivalent structures, methods, and uses such as are within the scope of the appended claims.

What is claimed is:

1. A non-transitory computer-readable storage medium comprising computer instructions which, responsive to being executed by a processor, cause the processor to perform operations comprising:
    analyzing data obtained from data sources of an internet-protocol television network, wherein the data obtained from the data sources includes an aggregate of network usage data determined from set top box data comprising voice over internet protocol usage for a plurality of subscribers of the Internet-protocol television network in a geographic area;
    correlating video provisioning information obtained from the data sources, individual subscriber channel viewing information, internet-usage data, subscriber data and demographic data to produce correlated information;
    generating one or more reports associated with the plurality of subscribers in the geographic area based on the correlated information, wherein the one or more reports comprise property information, geographic information, and time information; and
    processing the property information, the geographic information, and the time information of the one or more reports to enable content provider equipment to retrieve additional data about viewing groups identified from the plurality of subscribers.

2. The non-transitory computer-readable medium of claim 1, wherein the aggregate of network usage data includes information identifying programs and television commercials shown and includes video-on demand program category information.

3. The non-transitory computer-readable medium of claim 1, wherein the correlating further comprises correlating the set-top box data and content server data, wherein the video provisioning information further includes information identifying programs and television commercials shown on each channel during different time periods and includes television category information, and wherein the set-top box data comprises digital video recorder usage information, channel change information and channel viewing time information.

4. The non-transitory computer-readable medium of claim 1, wherein the analyzing of the data further comprises analyzing the data based on market research results comprising one of profession, income, or race distribution in a geographic area.

5. The non-transitory computer-readable medium of claim 1, wherein the internet protocol television network provides services to a plurality of set-top boxes adapted to output set-top box data in a form of video service usage information.

6. The non-transitory computer-readable medium of claim 5, wherein the video service usage information comprises one of digital video recorder usage, video-on-demand service usage, channel change information, channel viewing time information, or combinations thereof.

7. The non-transitory computer-readable medium of claim 1, wherein the operations further comprise predicting future video usage information for a geographic area.

8. The non-transitory computer-readable medium of claim 1, wherein the property information comprises subscriber background information including demographic, gender, age, profession, average household income, or combinations thereof.

9. The non-transitory computer-readable medium of claim 1, wherein the geographic information is defined by a zip code, a city region, a market sector, a national level, or combinations thereof.

10. The non-transitory computer-readable medium of claim 1, wherein the time information comprises hourly data, daily data, monthly data, yearly data, multi-year data, or combinations thereof.

11. The non-transitory computer-readable medium of claim 1, wherein the operations further comprise presenting a user interface enabling selection of a viewing level of the data based on a regional level, a market level, or a zip code level.

12. The non-transitory computer-readable medium of claim 11, wherein the operations further comprise:
detecting a selection of a viewing level; and
presenting the selected viewing level.

13. A method comprising:
analyzing, by a system comprising a processor, data obtained from data sources of an internet-protocol television network, wherein the data obtained from the data sources includes an aggregate of network usage data determined from set top box data comprising voice over internet protocol usage for a plurality of subscribers of the Internet-protocol television network in a geographic area;
correlating, by the system, video provisioning information obtained from the data sources, individual subscriber channel viewing information, Internet-usage data, subscriber data and demographic data to produce correlated information;
generating, by the system, a report associated with the plurality of subscribers in the geographic area based on the correlated information, wherein the report comprises property information, geographic information, and time information; and
processing, by the system, the property information, the geographic information, and the time information of the report to enable content provider equipment to retrieve additional data about viewing groups identified from the plurality of subscribers.

14. The method of claim 13, comprising predicting, by the system, future video usage information for a geographic area.

15. The method of claim 13, wherein the aggregate of network usage data includes information identifying programs and television commercials shown and includes video-on demand program category information.

16. A system comprising:
a memory to store instructions; and
a processing system coupled to the memory, wherein the processing system, responsive to executing the instructions, performs operations comprising:
analyzing data obtained from data sources of an internet-protocol television network, wherein the data obtained from the data sources includes an aggregate of network usage data determined from set top box data comprising voice over internet protocol usage for a plurality of subscribers of the Internet-protocol television network in a geographic area;
correlating video provisioning information obtained from the data sources, individual subscriber channel viewing information, internet-usage data, subscriber data and demographic data to produce correlated information;
generating a report associated with the plurality of subscribers in the geographic area based on the correlated information, wherein the report comprises property information, geographic information, and time information; and
processing the property information, the geographic information, and the time information of the report to enable content provider equipment to retrieve additional data about viewing groups identified from the plurality of subscribers.

17. The system according to claim 16, wherein the geographic information is defined by a zip code, a city region, a market sector, a national level, or combinations thereof.

18. The system of claim 16, wherein the operations further comprise:
detecting a selection of a viewing level; and
presenting the selected viewing level.

19. The system of claim 16, wherein a volume of content consumed by the plurality of subscribers is determined from a number of multicast channels in each geographic area that provide content services to equipment of the plurality of subscribers.

20. The system of claim 17, wherein the time information comprises hourly data, daily data, monthly data, yearly data multi-year data, or combinations thereof.

* * * * *